July 24, 1934. F. J. R. KARLSTRÖM ET AL Re. 19,256

HOUSEHOLD APPLIANCE

Original Filed May 14, 1930

INVENTORS

Fredrik Johan Robert Karlström
Johan Gunnar Nord

BY

Hein Hedlund

ATTORNEY

Reissued July 24, 1934

Re. 19,256

UNITED STATES PATENT OFFICE 19,256

HOUSEHOLD APPLIANCE

Fredrik Johan Robert Karlström and Johan Gunnar Nord, Stockholm, Sweden, assignors, by mesne assignments, to Electrolux Corporation, a corporation of Delaware Original No. 1,861,924, dated June 7, 1932, Serial No. 452,150, May 14, 1930. Application for reissue June 1, 1934, Serial No. 728,562. In Sweden May 16, 1929

8 Claims. (Cl. 128—37)

Our invention relates to household appliances and particularly to appliances for use in connection with small portable vacuum cleaners. More especially our invention has reference to a vibrator for massage apparatus actuated by the flow of air produced by a vacuum cleaner and preferably by the suction of a vacuum cleaner.

Among the objects of our invention are: to provide a vibrator which is efficient in operation, easy to manipulate and which operates on air as an impelling force rather than electricity or liquid. We preferably utilize a reaction turbine having unbalanced rotors to produce the vibration and arrange the turbine to be driven by air suction. We regulate the intensity of vibration by controlling the air flow and this preferably by providing a regulatable by-pass connection for atmospheric air around the turbine, that is, direct to the suction pipe instead of through the turbine. We prefer the use of suction for operating a vibrator in connection with a vacuum cleaner unit partly because this avoids having particles of dirt blown into the vibrator turbine, which may have become lodged on the inside of the tube connecting the vacuum cleaner unit with the vibrator, and partly because air blast against the part of the body to be treated is prevented. We use a turbine with a plurality of rotors in order to obtain considerable power for causing the vibration in a minimum of space occupied by the vibrator motor.

Our novel impeller for producing vibration may be adapted to other uses.

Further objects and advantages of our invention will be apparent from the following description considered in connection with the accompanying drawing which forms a part of the specification and in which.

Figure 1:
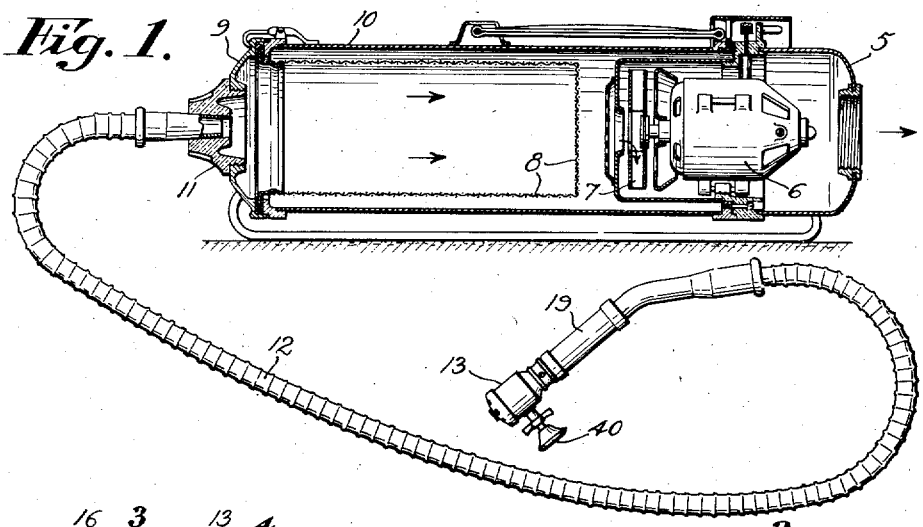
Fig. 1 is an elevational view of a preferred embodiment of our invention showing a vacuum cleaner in combination with a vibrator.

Reference character 10 designates a small portable vacuum cleaner unit of known design. It comprises a barrel portion to the ends of which are secured caps 5 and 9 by means of spring clips or other suitable means. A dust bag 8 is held in place between cap 9 and the cylindrical portion. A fan 7 driven by a motor 6 produces a current of air through the cleaner unit from the inlet in cap 9 to the outlet opening in cap 5. Secured in the inlet of cleaner 10 is a coupling member 11, preferably made of electric insulating material such as ebonite or phenol condensation product, Attached to coupling 11 is one end of a flexible hose 12 to the other end of which is attached a vibrator designated generally by reference character 13 and essentially comprising a vibrator motor and a massage attachment or tool.

The vibrator motor comprises a tubular housing 26 having a cap 15 on one end thereof in which are formed holes 14 for the passage therethrough of air. Cap 15 is secured to the housing by means of screws 16.

Mounted within housing 26 is a small reaction turbine comprising stationary guides 23, 24 and 25 having oblique vanes arranged alternately with turbine runners 20, 21 and 22 having oppositely directed oblique vanes. The runners are rigidly secured to a single shaft 27 which is rotatably mounted in ball-bearings 28 and 29 supported by the structure comprising guide vanes 23 and 24, respectively.

Figure 3:
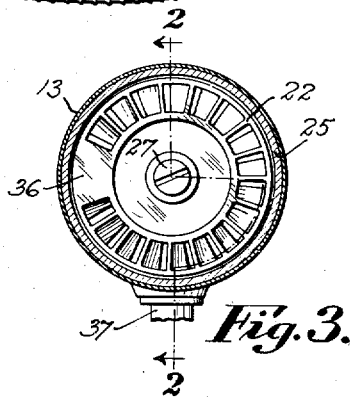
Fig. 3 is a view taken on the line 3—3 of Fig. 2 and shows a turbine runner forming part of the vibrator.

Runners 20, 21 and 22 are constructed as shown in Figure 3, with a concentration of weight 36 forming an eccentric mass on one side thereof near their periphery so that the center of gravity of the runners is displaced from the axis of rotation and the runners are unbalanced and will wabble on rotation. When the runners are mounted on shaft 27 the eccentric weights 36 in the different runners are in alignment.

The end of housing 26 opposite from cover 15 is connected to a tubular member 19 which in turn is detachably connected to hose 12. Openings 17 are formed near this end of the housing and are arranged to be closed more or less by means of an annular rotatable member 18 provided with apertures 17*a* which may be more or less aligned with, or member 18 may close the openings 17 in the housing. It will be seen that the openings 17 and the member 18 with openings 17*a* constitute a regulatable by-pass for admitting air directly to the suction conduit 19 without passing through the turbine.

Sockets 37 and 38 are attached to housing 26 and cover 15, respectively, and are adapted to receive a suitable massage device 40, by means of which the vibrations are communicated to the subject to be treated.

Figure 2:
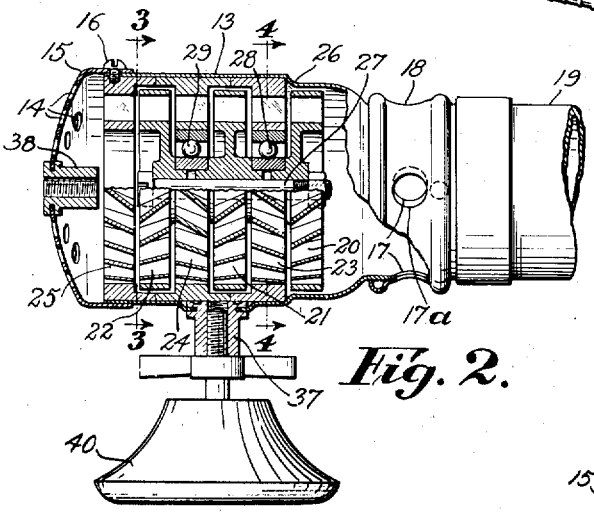
Fig. 2 is an enlarged view, partially in cross-section of the vibrator shown in Fig. 1 and taken on the line 2—2 of Fig. 3.
Figure 5:
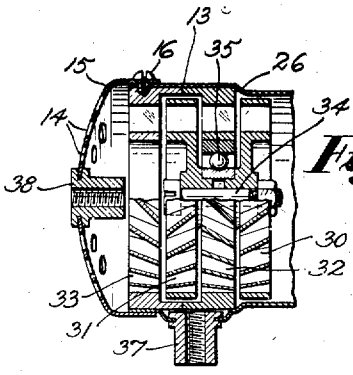
Fig. 5 is a view partly in cross-section of a modified form of vibrator motor.
Figure 4:
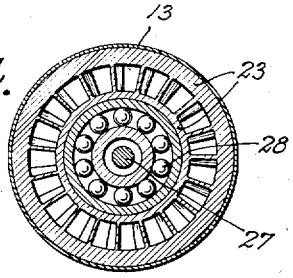
Fig. 4 is a cross-sectional view taken on the line 4—4 of Fig. 2.

The modification illustrated in Fig. 5 is similar to that shown in Fig. 2 except that the turbine has two stages instead of three. In this case the shaft 34, carrying runners 30 and 31, is mounted in a single bearing 35 carried in the structure comprising guide 32. The runners are alternately disposed with reference to the guides 32 and 33.

The operation of the device is as follows:

When the vacuum cleaner 10 is started, air is drawn thereinto from the hose 12. This air is supplied through the openings 14 in cover 15 or through openings 17, 17*a* in housing 26. The air drawn through openings 14 is directed by the guide vanes of guide 25 against runner 22 causing it to rotate. The air discharged from runner 22 is redirected by the vanes of guide 24 against runner 21 from which it is discharged to be directed by the vanes of guide 23 against runner 20. The result of the flow of air through the turbine is to cause the rotor thereof, comprising the three runners mounted on shaft 27 to rotate at a high rate of speed. The eccentric weights 36 attached to the runners cause the rotor as a whole to be unbalanced and hence vibrations are set up. These vibrations are transmitted to the housing and thence to the massage device 40.

The amount of air drawn in through openings 14 may be varied by varying the size of the by-pass openings by rotating member 18 to more or less close the by-pass openings. This varies the speed of the turbine and hence the period and intensity of vibrations set up.

It will thus be seen that we have provided a vibrating device which may be operated by power supplied by an ordinary vacuum cleaner and which may be transported from place to place about the house. As the device is not operated by air blown from the cleaner there is no chance that dirt contained in the hose, which ordinarily is used for cleaning purposes, will be blown out into the room. Likewise it is not necessary to remove the dust bag from the cleaner when the latter is used to operate the vibrator. Another advantage of our invention resides in the fact that no electrical connections are made to the vibrator and hence all danger from shock is eliminated. Even if one side of the electric circuit operating the vacuum cleaner motor becomes grounded on the cleaner, frame current cannot be transmitted to the vibrator due to the insulating coupling 11.

While we have shown and described preferred embodiments of our invention, it is to be understood that they are merely for the purpose of illustration and the scope of our invention is to be gaged by the appended claims viewed in the light of prior art.

What we claim is:

1. In a device of the character described, in combination, a vacuum cleaner having a suction inlet, a turbine, a conduit connecting said turbine with said inlet, said turbine having an unbalanced runner for producing vibrations and a massage device secured to said turbine.

2. In a device of the character described, in combination, a vacuum cleaner having a suction inlet, a turbine, a conduit connecting said turbine with said inlet, said turbine having an unbalanced runner for producing vibrations, a massage device secured to said turbine and a regulatable by-pass for varying the quantity of air drawn through the turbine.

3. In a device of the character described, in combination, a vacuum cleaner having a suction inlet, a turbine, a conduit connecting said turbine with said inlet, said turbine having an unbalanced runner for producing vibrations, a massage device secured to said turbine and means comprising an adjustable opening in said conduit to vary the quantity of air drawn through the turbine.

4. In a device of the character described, in combination, a vacuum cleaner having a suction inlet, a turbine, and a conduit connecting said turbine with said inlet, said turbine comprising a plurality of stationary guides, each guide having a plurality of oblique guide vanes, a shaft, a plurality of turbine runners mounted on said shaft, each turbine runner having a plurality of oblique vanes, and a bearing for said shaft carried by said stationary guides.

5. In a device of the character described, in combination, a vacuum cleaner having a suction inlet, a turbine, and a conduit connecting said turbine with said inlet, said turbine comprising a stationary guide having a plurality of oblique vanes, a shaft, a turbine runner mounted on said shaft and having oblique vanes and an eccentric weight, and a bearing for said shaft carried by said stationary guide.

6. A device of the character described comprising, in combination, a vacuum cleaner unit, means to produce flow of air through said unit, said unit having an air inlet and an air outlet, a turbine comprising unbalanced rotatable mechanism for producing vibrations upon flow of air therethrough and a tool mounted on said turbine, the arrangement being such that air passes first through the turbine and then through the vacuum cleaner unit.

7. A vibrator turbine comprising a plurality of stationary guides, each having a plurality of oblique vanes, a shaft, a plurality of turbine runners mounted on said shaft, each turbine runner having oblique vanes and an eccentric weight, and all of the bearings for said shaft being carried by said stationary guides.

8. In a device of the character described, in combination, a vacuum cleaner having a suction inlet, a turbine, a conduit connecting said turbine with said inlet, said turbine having an unbalanced runner for producing vibrations and a vibrator member secured to said turbine.

FREDRIK JOHAN ROBERT KARLSTRÖM.
JOHAN GUNNAR NORD.